US008010811B2

(12) United States Patent
Leininger et al.

(10) Patent No.: US 8,010,811 B2
(45) Date of Patent: Aug. 30, 2011

(54) POWER CONTROLLER COUPLING ASSEMBLIES AND METHODS

(75) Inventors: Shawn Leininger, Trenton, MO (US); William C. Bohlinger, Buffalo City, WI (US); Eric E. Ellis, Columbia, MO (US)

(73) Assignee: Watlow Electric Manufacturing Company, St.Louis, MO (US)

( * ) Notice: Subject to any disclaimer, the term of this patent is extended or adjusted under 35 U.S.C. 154(b) by 1215 days.

(21) Appl. No.: 11/701,895

(22) Filed: Feb. 2, 2007

(65) Prior Publication Data
US 2007/0204177 A1 Aug. 30, 2007

Related U.S. Application Data

(60) Provisional application No. 60/764,538, filed on Feb. 2, 2006.

(51) Int. Cl.
*G06F 1/00* (2006.01)
(52) U.S. Cl. ............................................. 713/300; 439/1
(58) Field of Classification Search .................. 713/300; 439/1
See application file for complete search history.

(56) References Cited

U.S. PATENT DOCUMENTS

| | | | |
|---|---|---|---|
| 3,510,825 A | 5/1970 | Quackenbush | |
| 6,023,052 A * | 2/2000 | Carl et al. | 219/483 |
| 6,325,650 B1 | 12/2001 | Wilson et al. | |
| 6,329,616 B1 | 12/2001 | Lee | |
| 6,483,435 B2 * | 11/2002 | Saha et al. | 340/650 |
| 6,767,255 B1 | 7/2004 | Croswell | |
| 6,894,254 B2 | 5/2005 | Hauschulz | |
| 7,401,237 B2 * | 7/2008 | Hara | 713/300 |
| 7,442,077 B2 * | 10/2008 | Peress et al. | 439/505 |
| 7,495,415 B2 * | 2/2009 | Kanouda et al. | 320/112 |
| 2002/0052133 A1 * | 5/2002 | Henriott et al. | 439/215 |
| 2002/0189848 A1 | 12/2002 | Hawker et al. | |
| 2003/0230934 A1 | 12/2003 | Cordelli et al. | |
| 2004/0130213 A1 | 7/2004 | Goldsholl | |
| 2005/0081070 A1 | 4/2005 | Milan | |
| 2005/0102043 A1 | 5/2005 | Menas et al. | |
| 2005/0206242 A1 * | 9/2005 | Kanouda et al. | 307/66 |
| 2009/0085514 A1 * | 4/2009 | Mizoguchi et al. | 320/113 |

FOREIGN PATENT DOCUMENTS

| | | |
|---|---|---|
| DE | 20 2004 010869 | 10/2004 |
| DE | 10 2004 029999 | 1/2006 |
| EP | 1124287 | 8/2001 |
| EP | 1575136 | 9/2005 |
| JP | 11 040295 | 2/1999 |
| WO | WO 03/052880 | 6/2003 |
| WO | WO 2004/075348 | 9/2004 |

* cited by examiner

*Primary Examiner* — Thomas Lee
*Assistant Examiner* — Jaweed A Abbaszadeh
(74) *Attorney, Agent, or Firm* — Brinks Hofer Gilson & Lione

(57) ABSTRACT

A variety of power controller coupling assemblies are provided that include at least one power controller, at least one cable assembly coupled to the power controller, and a plurality of power loads coupled to the power controller and the cable assembly. Power is provided from the power controller to the power loads through the cable assembly in a configuration such that power is provided to each of the power loads if one or more of the power loads should become disconnected from the power controller coupling assembly. Additionally, various cable assemblies are provided that include a plurality of power cables connecting a plurality of connectors, each of the connectors defining a number of conductor positions for providing power from a power source to at least one power controller and to a plurality of power loads.

20 Claims, 16 Drawing Sheets

POWER CONTROLLER COUPLING ASSEMBLIES AND METHODS

CROSS-REFERENCE TO RELATED APPLICATIONS

This application claims the benefit of U.S. Provisional Application No. 60/764,538, filed on Feb. 2, 2006. The disclosure of the above application is incorporated herein by reference in its entirety.

FIELD

The present disclosure relates generally to power control systems and more specifically to coupling assemblies and methods for operating power controllers.

BACKGROUND

The statements in this section merely provide background information related to the present disclosure and may not constitute prior art.

Present power control systems typically require a power controller for each power load in a sequence of controlled process operations. Where the process under control includes a sequence of heater stages, for example, with each heater having its own temperature sensor, a separate power controller is required for each heater. Should a process design change alter a heater configuration and/or eliminate the need for a power controller for a heater, significant rewiring of the power cabling may be required to implement the design change.

Additionally, different heaters or heater assemblies are often required when coupled directly to a power controller. As such, when a change or reconfiguration of the process and its related system components is required, the heaters or heater assemblies must be changed, thereby requiring additional parts inventory and additional expenses associated with the parts, labor, and downtime for the reconfiguration.

SUMMARY

In one form, a power controller coupling assembly is provided that comprises a power controller, an adapter cable assembly coupled to the power controller, a primary power load coupled to the power controller through the adapter cable assembly, a jumper cable assembly coupled to the adapter cable assembly, a secondary power load coupled to the jumper cable assembly, a terminator cable assembly coupled to the jumper cable assembly, and a tertiary power load coupled to the terminator cable assembly. Power is provided from the power controller to the power loads through the cable assemblies in a parallel configuration such that power is provided to each of the power loads if one or more of the power loads should become disconnected from the power controller coupling assembly.

In another form, a power controller coupling assembly is provided that comprises a power controller, an adapter cable assembly coupled to the power controller, a primary power load coupled to the power controller through the adapter cable assembly, a first terminator cable assembly coupled to the adapter cable assembly, a secondary power load coupled to the first terminator cable assembly, a second terminator cable assembly coupled to the adaptor cable assembly, and a tertiary power load coupled to the second terminator cable assembly. Power is provided from the power controller to the power loads through the cable assemblies in a parallel configuration such that power is provided to each of the power loads if one or more of the power loads should become disconnected from the power controller coupling assembly.

In yet another form, a power controller coupling assembly is provided that comprises a plurality of power controllers, a corresponding plurality of jumper cable assemblies coupled to the plurality of power controllers, at least one terminator cable assembly coupled to at least one of the plurality of power controllers, and a corresponding plurality of power loads coupled to the power controllers through the jumper cable assemblies and the terminator cable assembly. Power is provided from a power source to the plurality of power controllers to the plurality of power loads through the cable assemblies in a configuration such that power is provided to each of the power controllers and power loads if one or more of the power controllers should become disconnected from the power controller coupling assembly.

In still another form, a power controller coupling assembly is provided that comprises at least one power controller, at least one cable assembly coupled to the power controller, and a plurality of power loads coupled to the power controller and the cable assembly. Power is provided from the power controller to the power loads through the cable assembly in a configuration such that power is provided to each of the power loads if one or more of the power loads should become disconnected from the power controller coupling assembly.

Further yet, in another form, a power cable assembly is provided that comprises at least one power cable connecting a plurality of connectors, each of the connectors defining a number of conductor positions for providing power from a power source to at least one power controller and to a plurality of power loads such that power is provided to each of the power loads if one or more of the power loads or the power controllers should become disconnected from the power cable assembly.

Methods of operating the power controller coupling assemblies and the power cable assemblies as illustrated and described herein are also provided by the present disclosure and are intended to be fully within the scope of the disclosure.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 2:
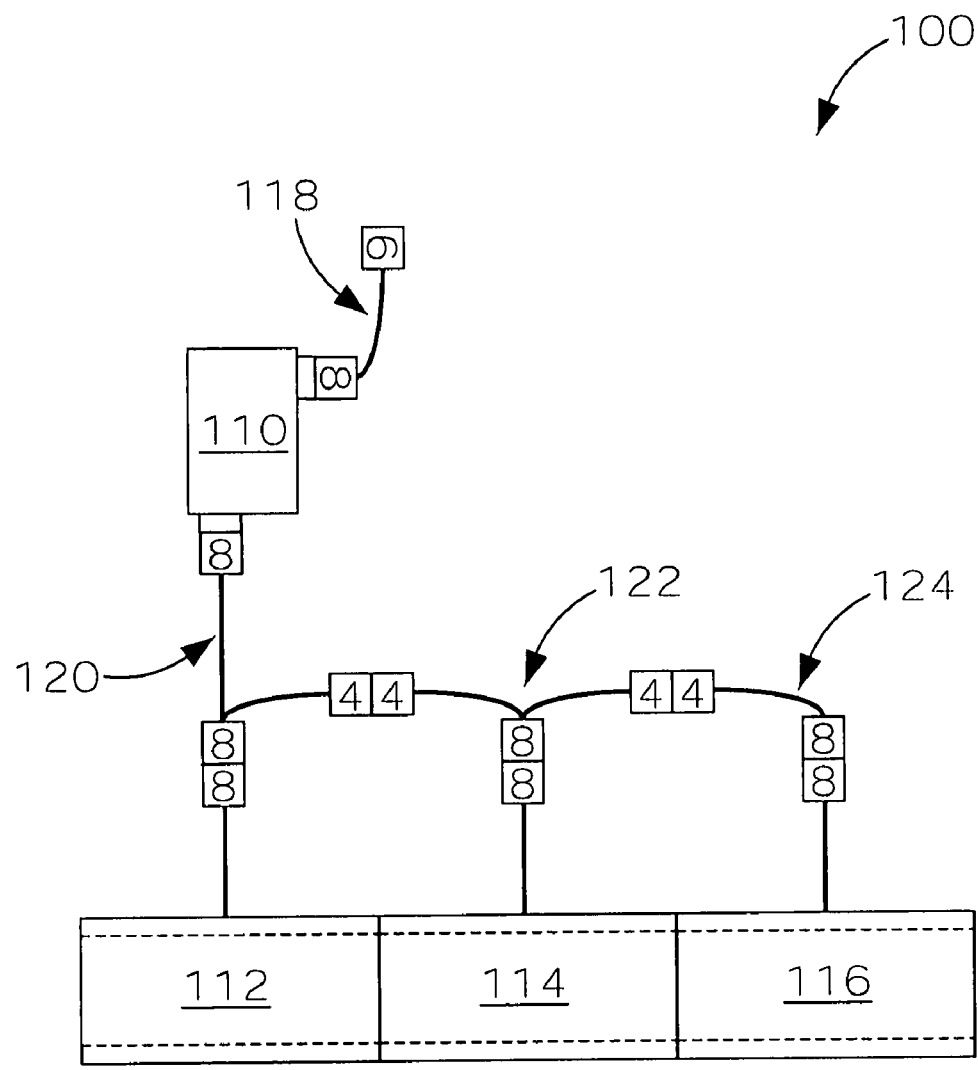
FIG. 2 is a block diagram schematically illustrating a power controller coupling assembly for providing power from a single power controller to multiple, or a plurality of, power loads according to the principles of the present disclosure.
Figure 5:
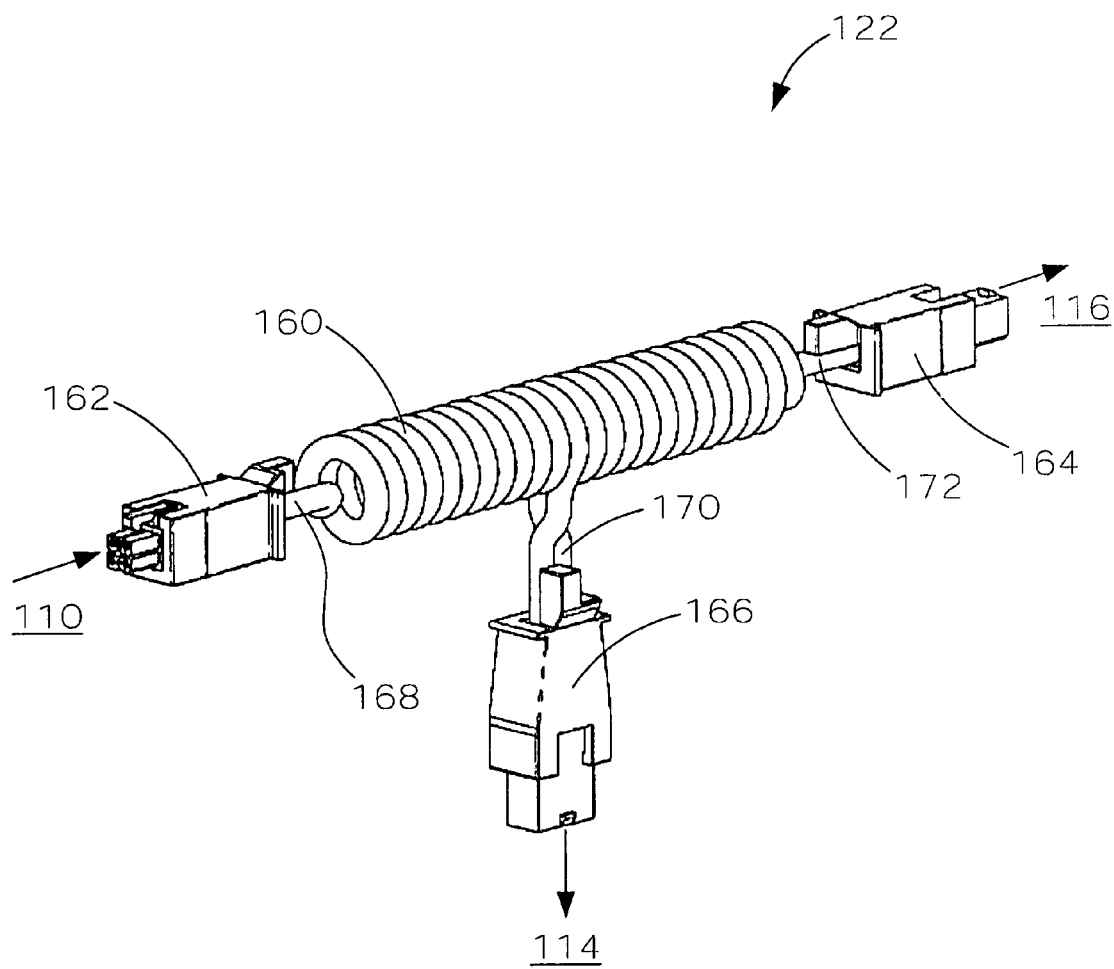
FIG. 5 is a perspective view of a jumper cable assembly corresponding to the power controller coupling assembly of FIG. 2, and in one form being coiled according to the principles of the present disclosure.
Figure 6:
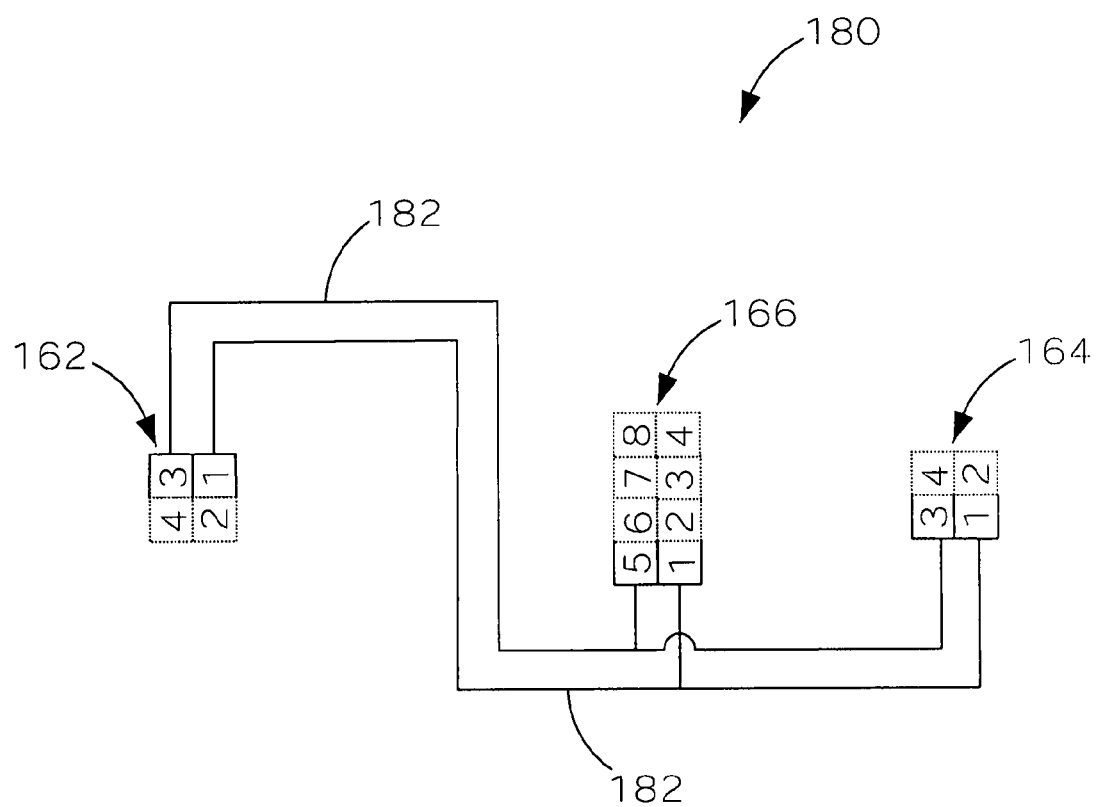
Figure 7:
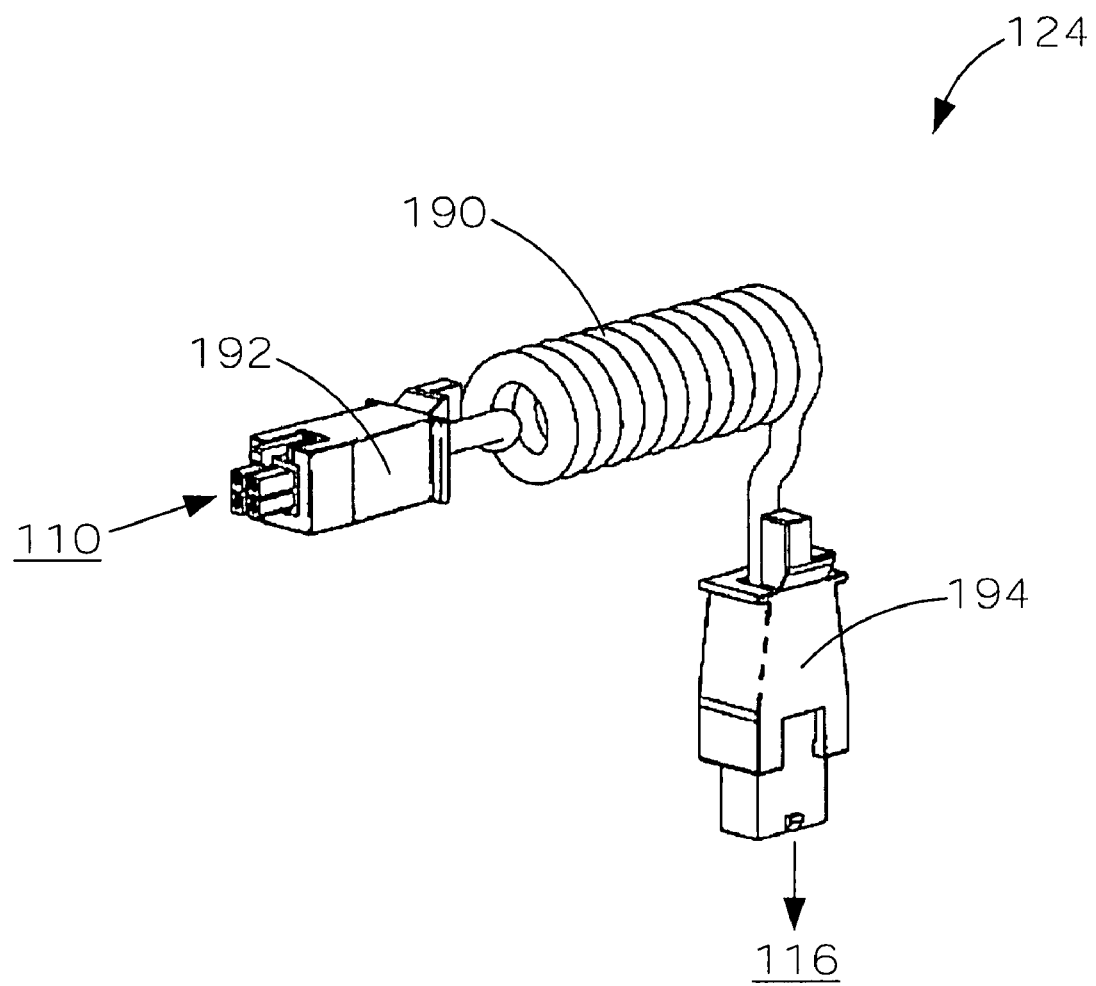
Figure 8:
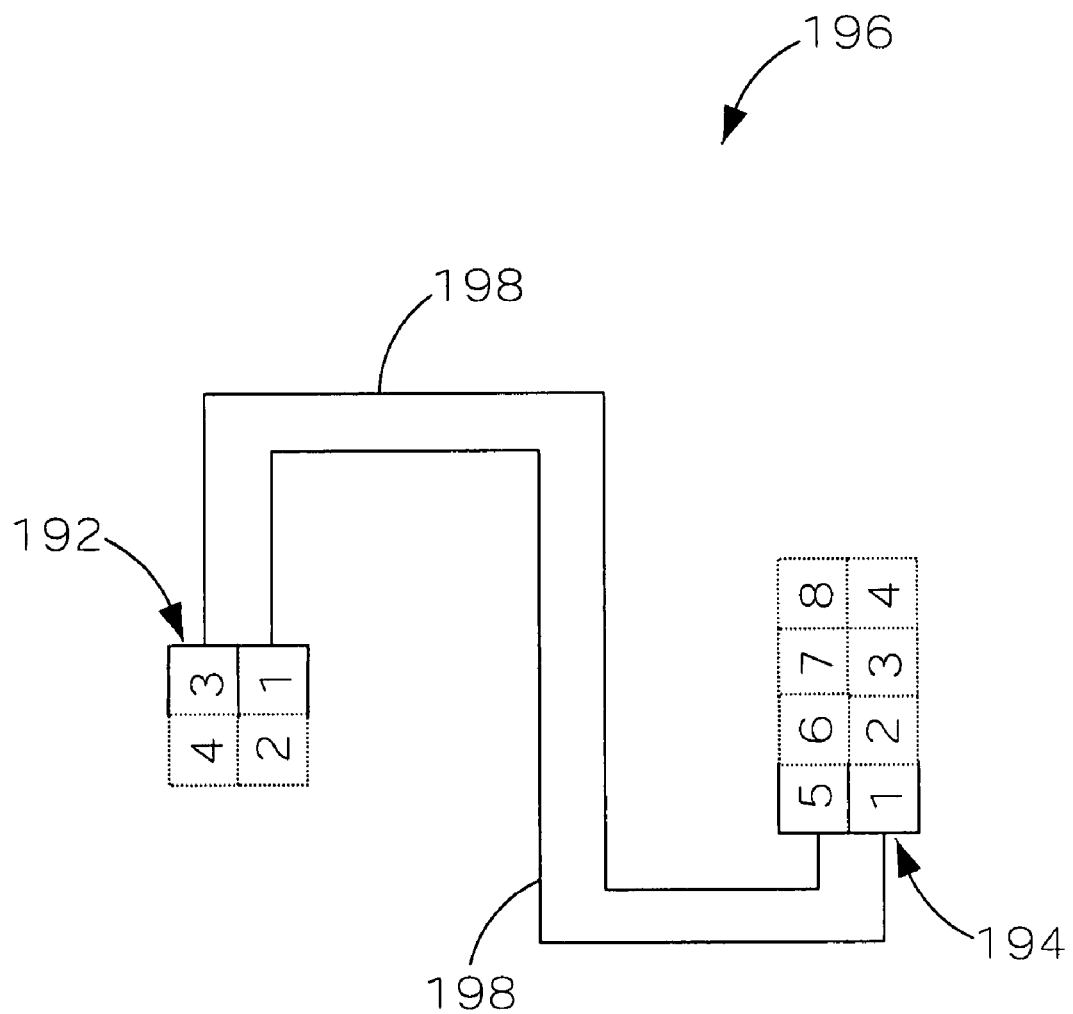
Figure 9:
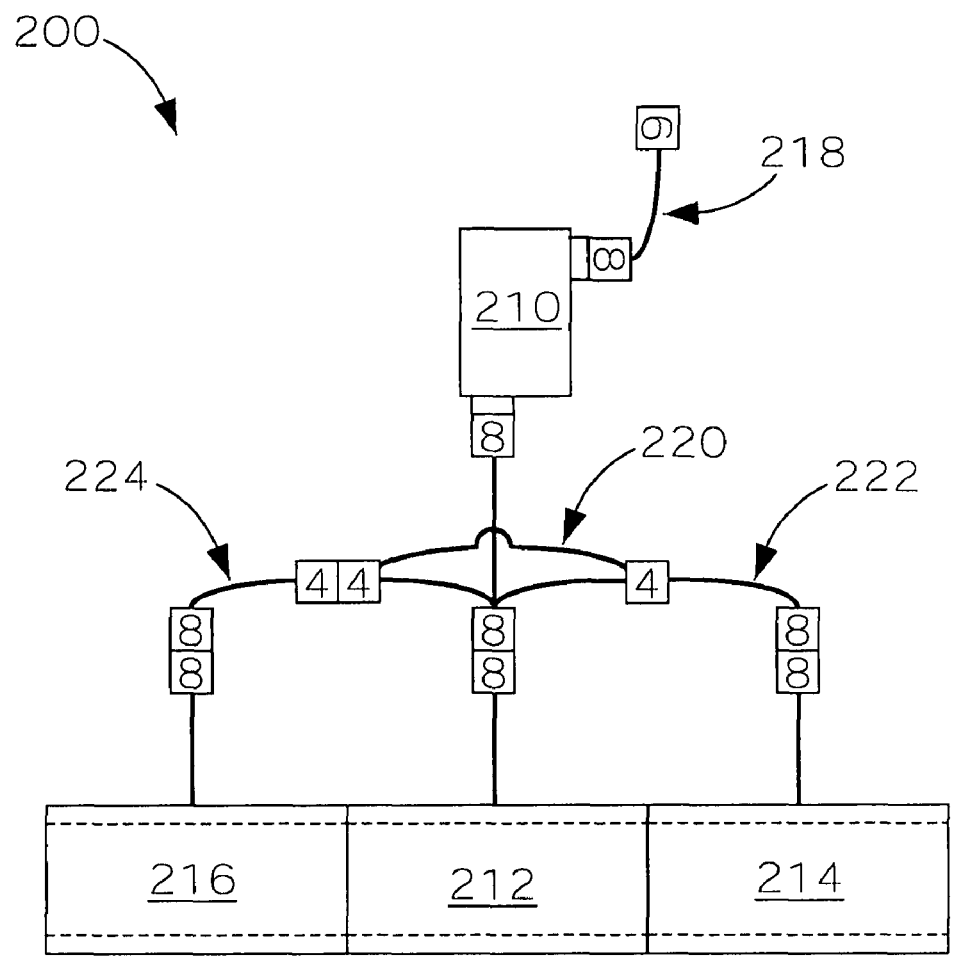
Figure 10:
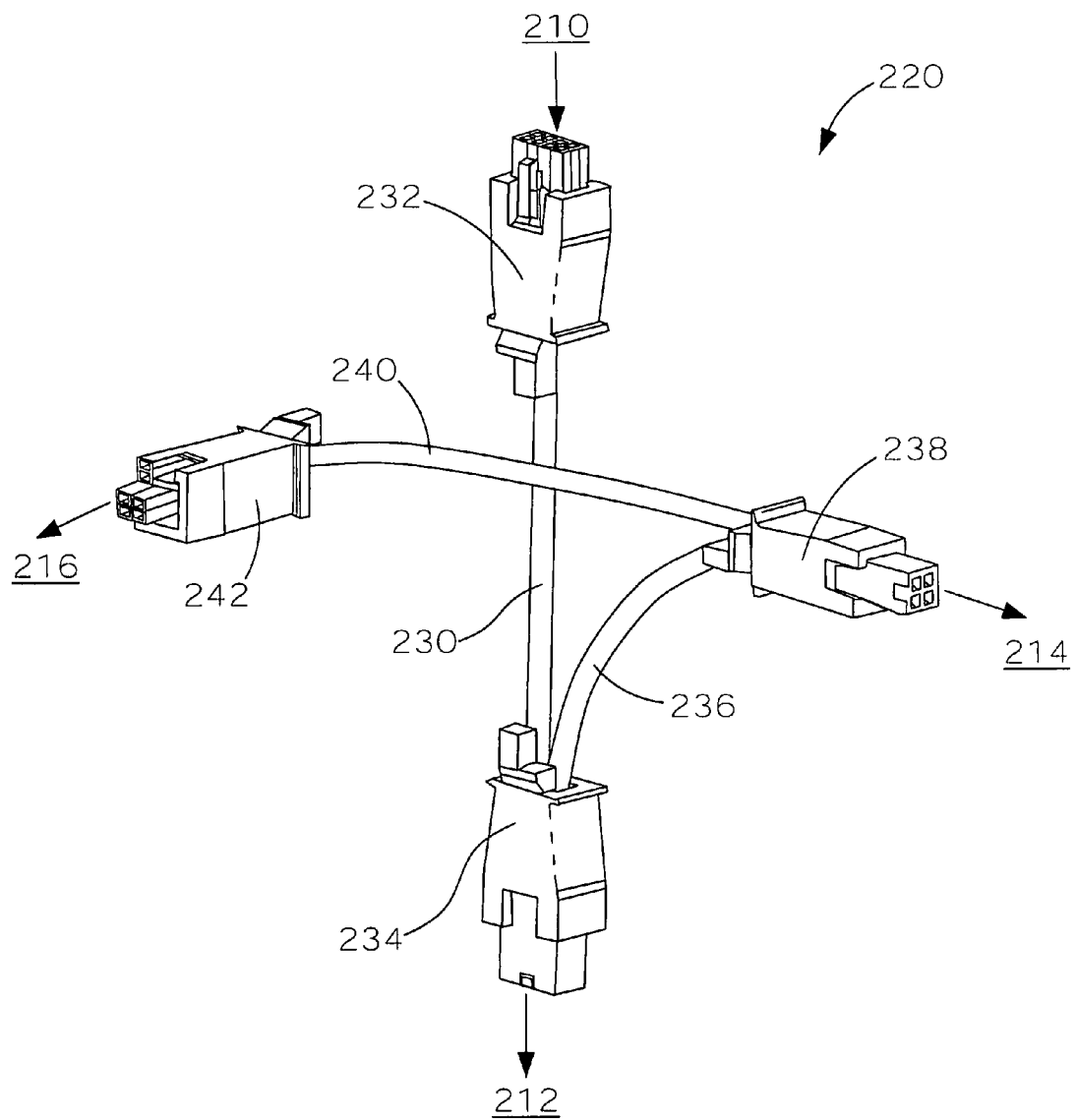
Figure 11:
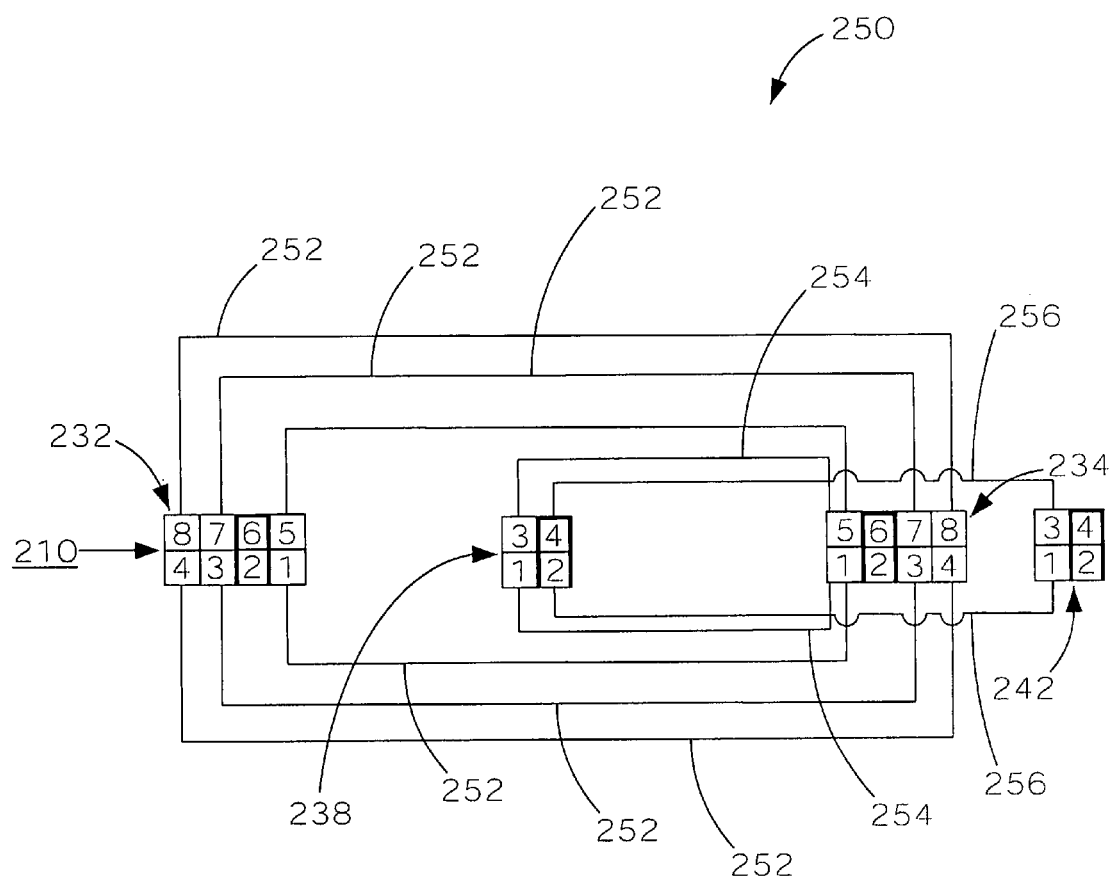
Figure 12:
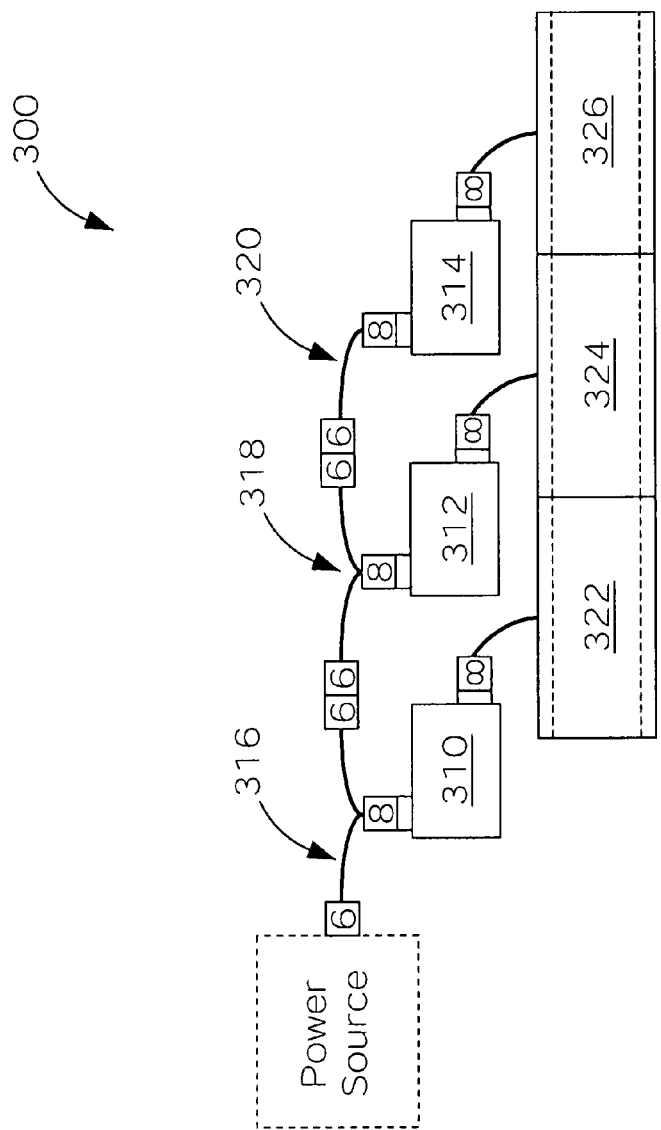
Figure 13:
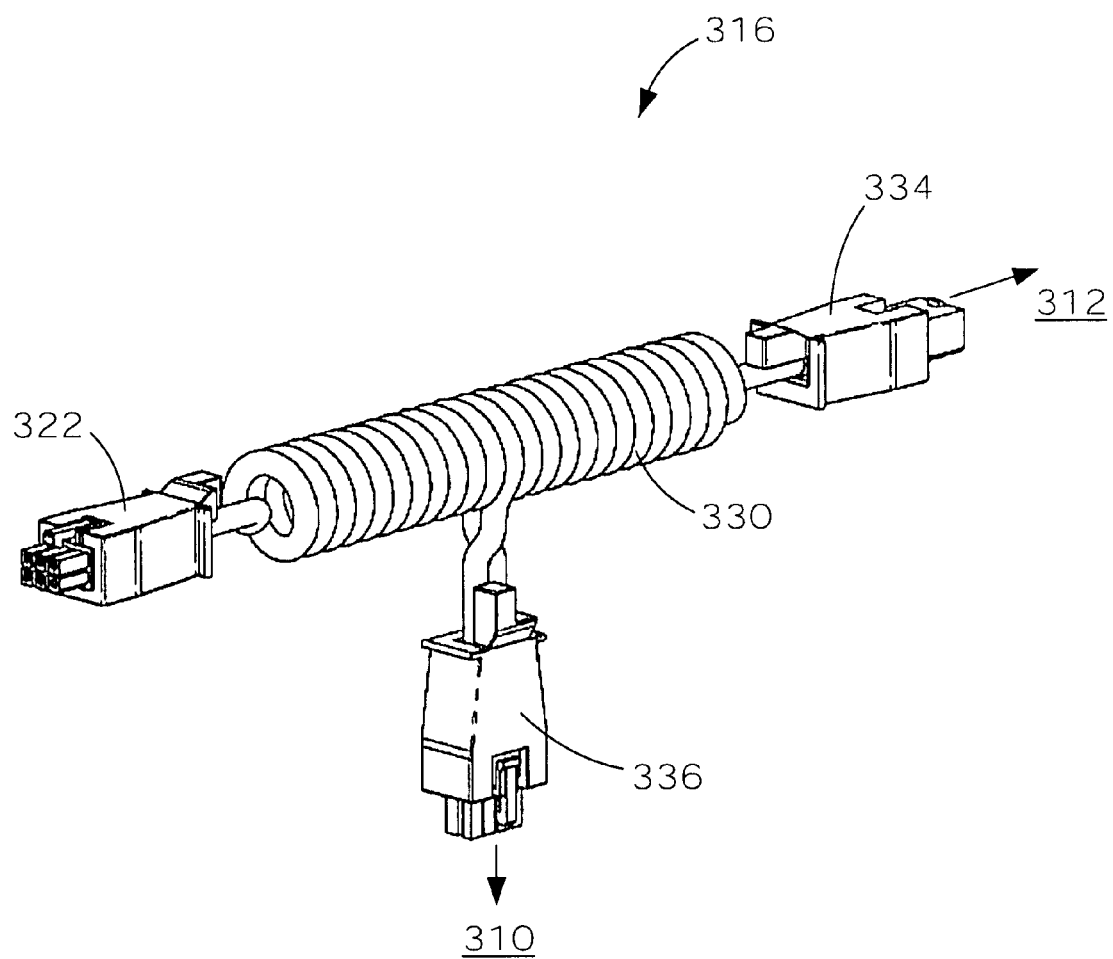
Figure 14:
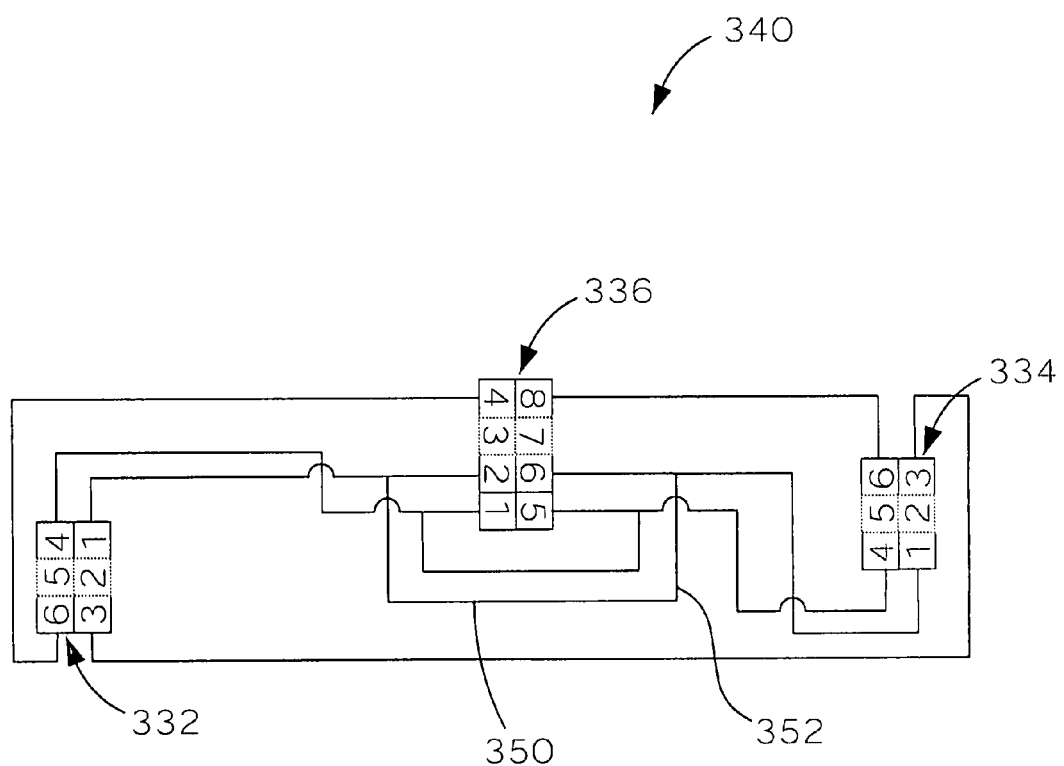
Figure 15:
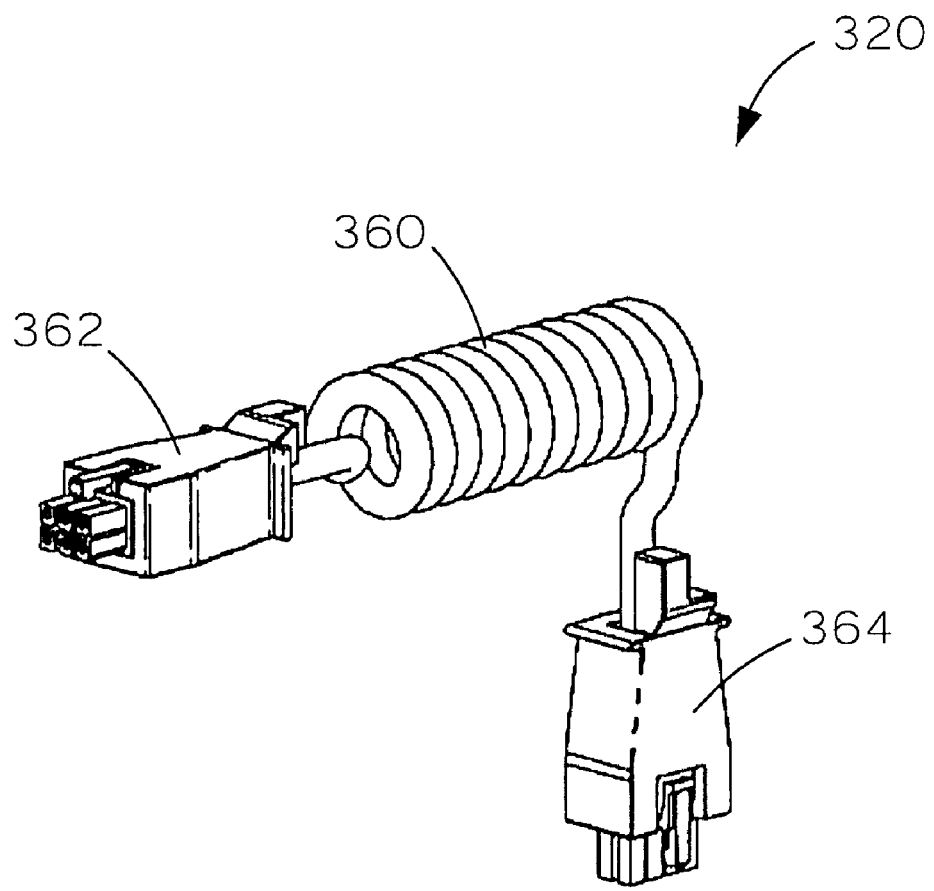
Figure 16:
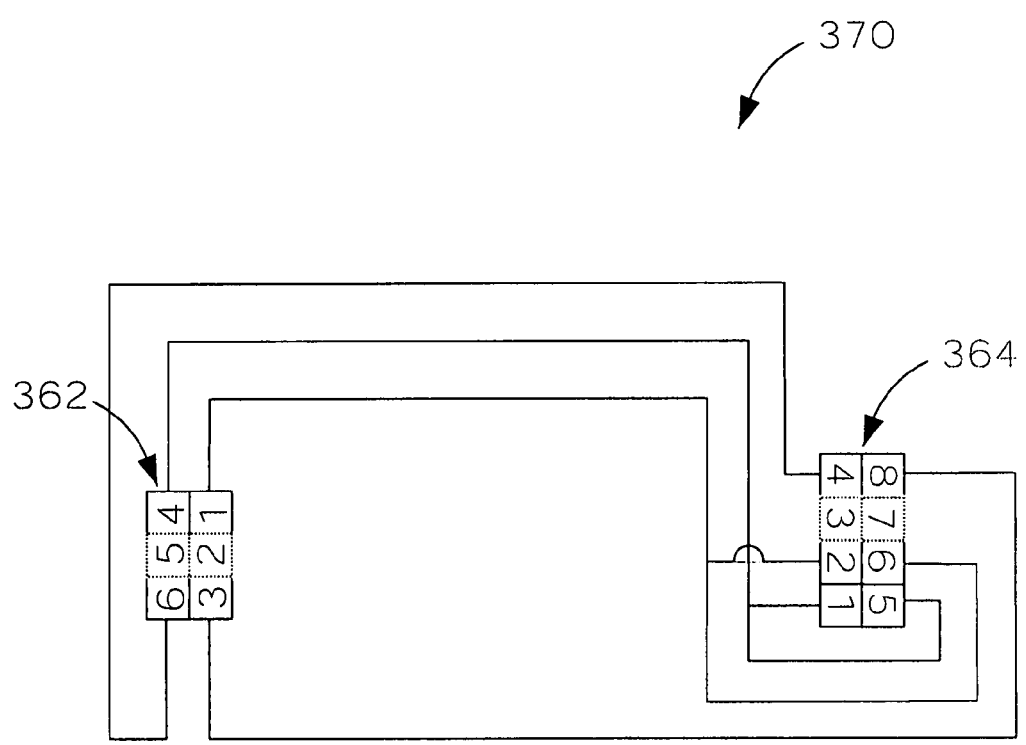

FIG. 6 a schematic diagram of an electrical circuit for the jumper cable assembly corresponding to FIG. 5 according to the principles of the present disclosure;

FIG. 7 is a perspective view of a terminator cable assembly corresponding to the power controller coupling assembly of FIG. 2, and in one form being coiled according to the principles of the present disclosure;

FIG. 8 is a schematic diagram of an electrical circuit for the terminator cable assembly corresponding to FIG. 7 according to the principles of the present disclosure;

FIG. 9 is a block diagram schematically illustrating another form of a power controller coupling assembly for providing power from a single controller to multiple power loads according to the principles of the present disclosure;

FIG. 10 is a perspective view of an adapter cable assembly, corresponding to the power controller coupling assembly of FIG. 9, for providing power from a single controller to multiple power loads according to the principles of the present disclosure;

FIG. 11 is a schematic diagram of an electrical circuit for the adapter cable assembly corresponding to FIG. 10, for providing power to multiple power loads from a single power controller according to the principles of the present disclosure;

FIG. 12 is a block diagram schematically illustrating yet another form of a power controller coupling assembly for providing substantially uninterruptible power among a plurality of power controllers from a single or common power source according to the principles of the present disclosure;

FIG. 13 is a perspective view of a jumper cable assembly corresponding to the power controller coupling assembly of FIG. 12, and in one form being coiled according to the principles of the present disclosure;

FIG. 14 is a schematic diagram of an electrical circuit for the jumper cable assembly corresponding to FIG. 13 for providing power to multiple power controllers from a single power source according to the principles of the present disclosure;

FIG. 15 is a perspective view of a terminator cable assembly corresponding to the power controller coupling assembly of FIG. 12, and in one form being coiled according to the principles of the present disclosure; and FIG. 16 is a schematic diagram of an electrical circuit for the terminator cable assembly corresponding to FIG. 15 according to the principles of the present disclosure.

It should be understood that throughout the drawings, corresponding reference numerals indicate like or corresponding parts and features.

DETAILED DESCRIPTION

The following description is merely exemplary in nature and is not intended to limit the present disclosure, application, or uses.

Figure 1:
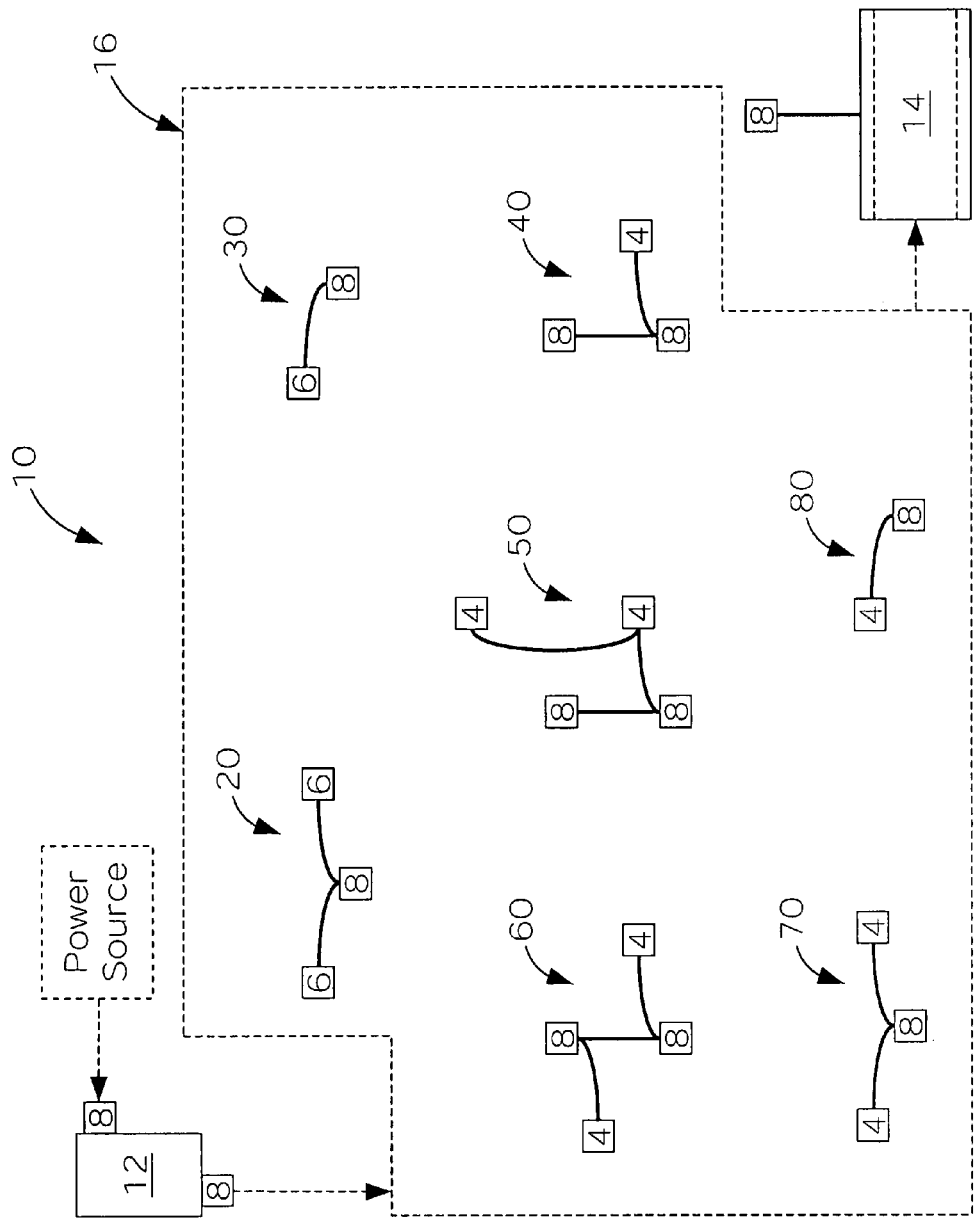
FIG. 1 is a block diagram schematically illustrating configurations of various cable assemblies within a power controller coupling assembly for coupling a power controller to a power load in a power control system according to the principles of the present disclosure.

Referring to FIG. 1, various components of a power controller coupling assembly 10 are illustrated and generally indicated to include a power controller 12, a power load 14, and a variety of cable assemblies 16. The cable assemblies 16, which are described in greater detail below, generally function to connect the power controller 12, or a plurality of power controllers 12, to a power source, and to the power load 14, or a plurality of power loads 14. The power load 14 in one form of the present disclosure is a heater. It should be understood that other power loads 14, such as a motor or an actuator, may also be employed while remaining within the scope of the present disclosure.

Each of the power controller 12, the power load 14, and the cable assemblies 16 include physical connectors at their end portions, which are designated by the numbered boxes in FIG. 1 to initially describe their various configurations as used further throughout the detailed description. More specifically, the numbers inside the boxes refer to the number of positions or conductors that can be accommodated by an individual physical connector. For example, the power load 14 as a heater is equipped with an 8 position connector cable for receiving power and for providing temperature signals back to the power controller 12. The power controller 12 includes an 8 position connector for receiving power from the power source and an 8 position connector for sending power to the power load 14 (or to different controllers as described in greater detail below). The various number of positions or conductors will be more fully understood with reference to the specific embodiments as described in greater detail below.

Referring now to the different cable assemblies 16, a "6-8-6" jumper cable assembly is illustrated and generally indicated by reference numeral 20. The 6-8-6 designation denotes three connectors with each number for each connector representing the number of conductor slots (also referred to herein as positions) in each connector. As described in greater detail below, the jumper cable assembly 20, in one form, is configured to provide power from a single power source to one or more power controllers 12 coupled in a "daisy chain" fashion, while an intermediate controller (not shown) can be removed from the overall system without disrupting power to any of the other power-coupled controllers. Generally, a "daisy chain" configuration as used herein refers to a bus wiring scheme in which, for example, device A is wired to device B, device B is wired to device C, etc. The last device is normally wired to a resistor or terminator. All devices may receive identical signals or, in contrast to a simple bus, each device in the chain may modify one or more signals before passing them on.

In this arrangement of the jumper cable assembly 20, one of the 6-position connectors would be coupled to a power source or another cable assembly coupled to a power source. The other 6-position connector would provide a portion of the received power to another cable assembly, which is in turn connected to another power controller. The 8 position connector is coupled to a power controller having a corresponding 8 position connector and is located intermediately between the two 6-position connectors of the jumper cable assembly 20. The jumper cable assembly 20 is configured and wired for including the 8-position connector with power conductors (not shown) and is wired (as described in greater detail below) to enable power to be provided from the first 6 position connector to the second 6 position connector independent of whether a controller is coupled to the 8 position connector. While in this embodiment the 8 position connector is located in a middle position between the two 6-position connectors, in other embodiments the location of the 8-position connector can vary, and may in some forms, be located at one end or the other, or any point therebetween while remaining within the scope of the present disclosure.

Next, a 6-8 terminator cable assembly is illustrated and generally indicated by reference numeral 30. The terminator cable assembly 30 is configured to provide power from the jumper cable assembly 20 to a controller positioned at an end of a daisy chained power line in a system that provides power from a power source to a plurality of power controllers. In this terminator cable assembly 30, the 6 position connector is configured to couple to the 6 position connector of the jumper cable assembly 20, and the 8 position connector is configured to couple to a power controller. Multiple jumper cable assemblies 20 may be employed with the terminator cable assembly 30, which correspond with multiple power controllers, and are described in greater detail below.

As further shown, an 8-8-4 adapter cable assembly is illustrated and generally indicated by reference numeral 40. The adapter cable assembly 40 is configured to provide power to a primary load and to one or more secondary loads from power provided by a single power controller. In this adapter cable assembly 40, the upper 8 position connector is coupled to the power controller, and the lower 8 position connector is coupled to the primary load. Power is then distributed to the 4 position connector, which is connected to one or more secondary or auxiliary power loads.

Yet another adapter cable assembly, which is configured as an 8-8-4-4 cable assembly, is illustrated and generally indicated by reference numeral 50. The adapter cable assembly 50 is similar to the previous adapter cable assembly 40 but includes two (2) 4 position connectors, one for a secondary power load, and another for a tertiary power load. This embodiment is configured to enable the delivery of power from the power controller in multiple directions from the 4 position connectors to multiple auxiliary power loads. Of course, the configuration of this adapter cable assembly 50 may differ in construction and architecture and still be within the scope of the present description. For example, one additional exemplary embodiment is illustrated and generally indicated by reference numeral 60. In this example, two 4 position connectors are coupled to respective 8 position connectors, rather than having the second 4 position connector being daisy chained from only one 8 position connector as with the adapter cable assembly 50. In other embodiments, additional connectors can be coupled to one or more of the connectors as illustrated and described herein and remain within the scope of the present disclosure.

Following from the adapter cable assembly 40, another jumper cable assembly configuration is illustrated and generally indicated by reference numeral 70. This jumper cable assembly 70 defines a 4-8-4 configuration and is adapted for receiving power at one of the 4 position connectors, coupling to a power load at the 8 position connector (shown as being intermediate but being capable of being positioned at any position on the jumper cable assembly 70) for feeding a portion of the received power to a power load. Additionally, a second 4 position connector is configured for coupling to another cable assembly for providing a portion of the power to additional cable assemblies or to a terminating cable assembly and to a final power load. In this arrangement, power is received from the first 4 position connector to both the 8 position connector and the other 4 position connector and can be advantageously configured to provide a portion of the power to the second 4 position connector independent of whether a power load is coupled to the 8 position connector.

Another terminator cable assembly is illustrated and generally indicated by reference numeral 80. The terminator cable assembly 80 defines a 4-8 configuration and is adapted for receiving power from another cable assembly such as the jumper cable assembly 70 and connecting with a power load at the 8 position connector for terminating the provided power along the power controller coupling assembly 10.

It should be understood that the various cable assemblies 16 as illustrated and described herein are intended to be illustrative of various cable and coupling assemblies of this disclosure. Additional details for these and other exemplary embodiments are provided in the discussion herein and in the various successive figures.

Referring now to FIG. 2, a power controller coupling assembly for providing power from a single power controller 110 to multiple power loads 112 (primary power load), 114 (secondary power load), and 116 (tertiary power load), is illustrated and generally indicated by reference numeral 100. The power controller 110 receives its power, by way of example, via a terminator cable assembly 118 having a 6-8 configuration. The power controller 110 is adapted for providing power to the primary power load 112 via an 8 position connector as shown. Load power is provided by the power controller 110 to the power loads 112, 114, and 116 first through an adapter cable assembly 120 having an 8-8-4 configuration as shown. The primary power load 112 is coupled to the adapter cable assembly 120 through an 8 position connector and receives a portion (primary power) of the provided power. The primary power load 112, which in one form is a heater, is also configured to provide sensor signals through the 8 position connector back to the power controller 110. The secondary power load 114, which is also preferably a heater, receives a portion (secondary power) of the power provided by the adapter cable assembly 120 through a jumper cable assembly 122. The jumper cable assembly 122 defines a 4-8-4 configuration, and as such provides secondary power to the secondary load 114 through the 8 position connector as shown. The jumper cable assembly 122 is further coupled to a terminator cable assembly 124, which defines a 4-8 configuration, for providing tertiary power to the tertiary power load 116 through an 8 position connector. In this configuration, the jumper cable assembly 122 can be configured (as described in greater detail below) to provide power received from the power controller 110 via the adaptor cable assembly 120 to the terminator cable assembly 124 and to the tertiary power load 116 independent of whether the secondary load 114 is coupled or uncoupled from its 8 position connector of the jumper cable assembly 122. As noted above, the connectors are shown indicating in the connector box an exemplary number of slots or positions within the connector. The physical cable assemblies and corresponding electrical circuits that correspond with the power controller coupling assembly 100 are now described in greater detail.

Figure 3:
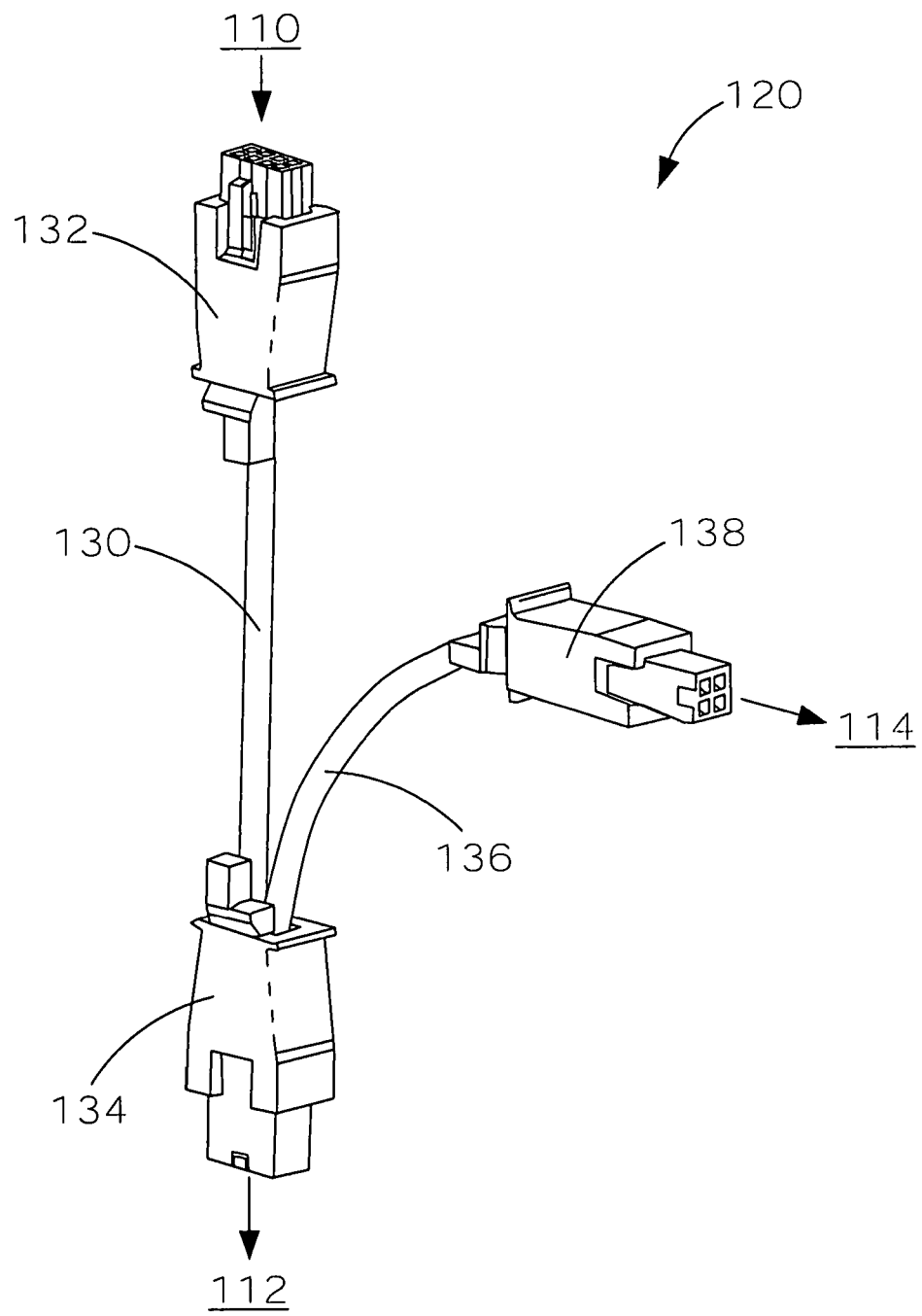
FIG. 3 is a perspective view of an adapter cable assembly, corresponding to the power controller coupling assembly of FIG. 2, for providing power from a single controller to multiple power loads according to the principles of the present disclosure.

Referring to FIG. 3, the adapter cable assembly 120 preferably comprises a primary cable 130 having a first connector 132 disposed at one end, and a second connector 134 disposed at another end. The first connector 132 is an 8 position connector and is adapted for coupling to the power controller 110. The second connector is also an 8 position connector and is adapted for coupling to the primary power load 112. The adapter cable assembly 120 further comprises a secondary cable 136, which is coupled to the second connector 134 and also includes a third connector 138 disposed at an end of the secondary cable 136, which is a 4 position connector adapted for coupling to the jumper cable assembly 122. In this embodiment, power is received from the power controller 110 through the first connector 132 and primary cable 130 and is furnished to the primary power load 112 through the second connector 134. The primary cable 130 to the power controller 110 may also include one or more sensor connections to the primary power load 112. Power to the secondary power load 114 is provided through the secondary cable 138 and its third connector 138.

Figure 4:
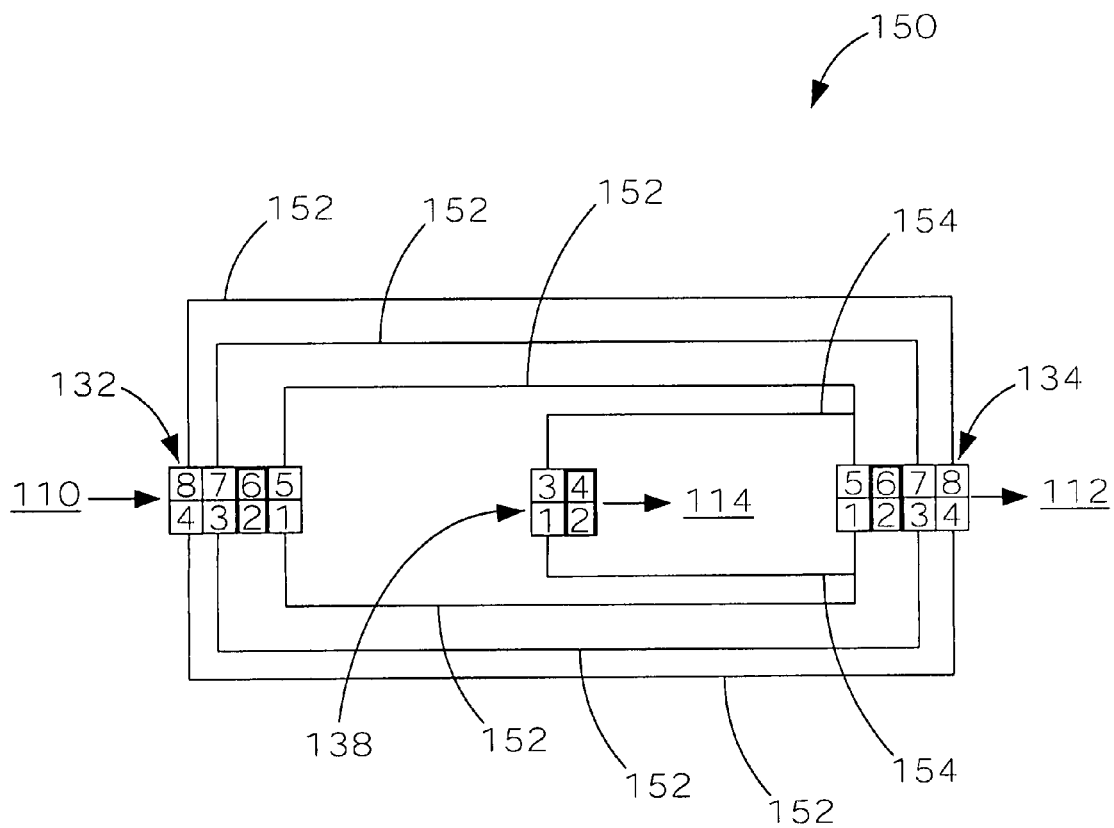
FIG. 4 is a schematic diagram of an electrical circuit for the adapter cable assembly corresponding to FIG. 3, for providing power to multiple power loads from a single power controller according to the principles of the present disclosure.

As shown in FIG. 4, an exemplary electrical circuit that corresponds with the adapter cable assembly 120 is illustrated and generally indicated by reference numeral 150. Generally, the electrical circuit 150 is adapted for providing power to the primary power load 112, which is equipped with sensors and leads in one form of the present disclosure, and for these sensors to be coupled back to the power controller 110. The electrical circuit 150 also provides for a portion of the power received from the power controller 110 to be transmitted to the secondary power load 114. Although not shown, the secondary and/or tertiary power loads 114 and 116 may be equipped with one or more sensors and sensor leads as with the primary power load 112. However, the adapter cable assembly electrical circuit 150 is configured to only distribute a portion of the power to the secondary and tertiary power loads 114 and 116 and not to couple any such possible sensors back to the power controller 110 or otherwise. As such, the primary power load 112 can be considered a "main" power load in that it is this power load that is monitored by the power controller 110 and for which the power controller 110 determines the amount of power to be provided to the entire power controller coupling assembly 100. As the secondary and tertiary power loads 114 and 116 are not configured to provide sensor signals back to the power controller 110 and are dependent on the signals from the primary power load 112, the secondary and tertiary power loads 114 and 116 can be considered as "dependent" power loads.

Referring back to the detailed electrical circuit 150, the first connector 132 is coupled to the second connector 134 through six (6) conductors or wires 152, and the second connector 134 is coupled to the third connector 138 through two (2) conductors or wires 154. The conductors 152 correspond with the primary cable 130, and the conductors 154 correspond with the secondary cable 136 as previously illustrated. The positions of each connector, which correspond with the individual conductors or wires 152 and 154, are designated by the numerals within the individual boxes as shown and are now described in greater detail. Positions 3, 4, 7 and 8 are for the sensor signals and are coupled between the first connector 132 and the second connector 134 while being electrically isolated from positions 1 and 5, which are the power positions. As such, the first connector 132 receives power from the power controller 110 and provides power to the second connector 134 through positions 1 and 5, and to the third connector 138 through positions 1 and 3. In other words, input power to the adaptor cable assembly 120 is received by the 8 position first connector 132 and distributed to the 8 position second connector 134 and the 4 position third connector 138. The second connector 134 provides power to the primary power load 112 and the third connector 138 provides power to the secondary power load 114. Since the power connections are in parallel, if the primary power load 112 is disconnected from the power controller coupling assembly 100, power is advantageously still provided to the secondary power load 114 without interrupting system operation. Preferably, eighteen (18) gauge wires are used for power distribution while sensor wires are typically twenty-four (24) gauge wires.

Referring now to FIGS. 5 and 6, the jumper cable assembly 122 of FIG. 2 and its corresponding electrical circuit are described in greater detail. The jumper cable assembly 122 preferably comprises a coiled power cable 160 that couples a first connector 162, a second connector 164, and a third connector 166. Advantageously, the alternate coiled structure of the power cable 160 reduces cable storage space while providing a truly flexible cable. Additionally, relatively short cable stubs 168, 170, and 172 to the respective connectors further facilitates a close connection to the power load.

The first connector 162 defines a 4 position configuration for coupling to the adapter cable assembly 120 as previously described. The second connector 164 also defines a 4 position configuration for coupling to the terminator cable assembly 124. The third connector 166 defines an 8 position configuration for coupling to the secondary power load 114. In this embodiment, power is received from the power controller 110 through the first connector 162 and coiled power cable 160 and is furnished to the secondary power load 114 through the third connector 166. Power to the tertiary power load 116 is provided through the second connector 164 and is described in greater detail below. As previously set forth, the jumper cable assembly 122 is referred to as a 4-8-4 connector configuration with the numbers representing the number of available wire termination slots/positions at each connector.

As shown in FIG. 6, the electrical circuit that corresponds with this jumper cable assembly 122 is illustrated and generally indicated by reference numeral 180. Connectors 162 and 164 each include with 4 slots/positions for parallel power distribution, and the third connector 166 includes 8 slots/positions for power load termination at the secondary power load 114. In this embodiment, power connections are preferably via eighteen (18) gauge wires 182 and only power connections are provided to the secondary and tertiary power loads 114 and 116. Since the power connections are in parallel, if the secondary power load 114 is disconnected from the power controller coupling assembly 100, power is advantageously still provided to the tertiary power load 116 without interrupting system operation.

Now referring to FIGS. 7 and 8, the terminator cable assembly 124 and its corresponding electrical circuit are described in greater detail. The terminator cable assembly 124 preferably comprises a coiled power cable 190 (which could alternately be a straight cable as illustrated in FIG. 3) that couples a first connector 192 to a second connector 194. The first connector 192 defines a 4 position configuration for coupling to the jumper cable assembly 122 as previously described. The second connector 194 defines an 8 position configuration for coupling to the tertiary power load 116. In this embodiment, power is received from the power controller 110 through the first connector 192 and coiled power cable 190 and is furnished to the tertiary power load 116 through the second connector 194. As previously set forth, the terminator cable assembly 124 is referred to as a 4-8 connector configuration with the numbers representing the number of available wire termination slots/positions at each connector.

As shown in FIG. 8, the electrical circuit that corresponds with this terminator cable assembly 124 is illustrated and generally indicated by reference numeral 196. The first connector 192 includes 4 slots/positions and the second connector 194 includes 8 slots/positions for power load termination at the tertiary power load 116. In this embodiment, power connections are preferably via eighteen (18) gauge wires 198 and only power connections are provided to the tertiary power load 116.

Referring to FIG. 9, another form of a power controller coupling assembly that provides power from a single power controller 210 to multiple power loads 212 (primary power load), 214 (secondary power load), and 216 (tertiary power load), is illustrated and generally indicated by reference numeral 200. Generally, in this alternate form, terminator cable assemblies are employed without jumper cable assemblies as previously described. More specifically, the power controller 210 receives its power, by way of example, via a terminator cable assembly 218 having a 6-8 configuration. The power controller 210 is adapted for providing power to the primary power load 212 via an 8 position connector as shown. Load power is provided by the power controller 210 to the power loads 212, 214, and 216 through an adapter cable assembly 220 having an 8-8-4-4 configuration as shown. The primary power load 212 is coupled to the adapter cable assembly 220 through an 8 position connector as shown and receives a portion (primary power) of the provided power. The primary power load 212, which in one form is a heater, is also configured to provide sensor signals through the 8 position connector back to the power controller 210. The secondary power load 214, which is also preferably a heater, receives a portion (secondary power) of the power provided by the adapter cable assembly 220 through a first terminator cable assembly 222. The first terminator cable assembly 222 defines a 4-8 configuration and provides secondary power to the secondary power load 214 through an 8 position connector as shown. The tertiary power load 216, which is also preferably a heater, receives a portion (tertiary power) of the power provided by the adapter cable assembly 220 through a second terminator cable assembly 224. The second terminator cable assembly 224 similarly defines a 4-8 configuration and provides tertiary power to the tertiary power load 216 through an 8 position connector as shown.

In this configuration, each of the terminator cable assemblies 222 and 224 can be configured (as described in greater detail below) to provide power received from the power controller 210 via the adaptor cable assembly 220 to their respective power loads 214 and 216 independent of whether the primary load 212 is coupled or uncoupled from its 8 position connector of the adaptor cable assembly 220. As noted above, the connectors are shown indicating in the connector box an exemplary number of slots or positions within the connector. The physical cable assemblies and corresponding electrical circuits that correspond with the power controller coupling assembly 200 are now described in greater detail.

Referring to FIGS. 10 and 11, the adapter cable assembly 220 and its corresponding electrical circuit are described in greater detail. The adapter cable assembly 220 comprises primary cable 230 that couples a first connector 232 and a second connector 234. A secondary cable 236 couples the second connector 232 to a third connector 238, and a tertiary cable 240 couples the third connector 238 to a fourth connector 242. Although not illustrated herein, the cables may alternately be in a coiled configuration as previously illustrated and described while remaining within the scope of the present disclosure.

The first connector 232 defines an 8 position configuration and is adapted for coupling to the power controller 210. The second connector also defines an 8 position configuration and is adapted for coupling to the primary power load 212. The third connector 238 defines a 4 position configuration for coupling to the secondary power load 214, and the fourth connector 242 similarly defines a 4 position configuration for coupling to the tertiary power load 216. In this embodiment, power is received from the power controller 210 through the first connector 232 and primary cable 230 and is furnished to the primary power load 212 through the first connector 234. Power to the secondary power load 214 is provided through the secondary cable 236 and third connector 238, and power to the tertiary power load 216 is provided from this third connector 238 through the tertiary cable 240 and to the fourth connector 242. As previously set forth, the adapter cable assembly 220 is referred to as an 8-8-4-4 connector configuration with the numbers representing the number of available wire termination slots/positions at each connector.

As shown in FIG. 11, the electrical circuit that corresponds with this adapter cable assembly 220 is illustrated and generally indicated by reference numeral 250. Generally, the electrical circuit 250 is adapted for providing power to the primary power load 212, which is equipped with sensors and leads, and for these sensors to be coupled back to the power controller 210. The electrical circuit 250 also provides for a portion of the power received from the power controller 210 to be transmitted to the secondary power load 214 and to the tertiary power load 216. Although not shown, the secondary and/or tertiary power loads 214 and 216 may be equipped with one or more sensors and sensor leads as with the primary power load 212, as previously set forth. The first connector 232 is coupled to the second connector 234 through six (6) conductors or wires 252, the second connector 234 is coupled to the third connector 238 through two (2) conductors or wires 254, and the third connector 238 is coupled to the fourth connector 242 through two (2) conductors or wires 256. The conductors 252 correspond with the primary cable 230, the conductors 254 correspond with the secondary cable 236, and the conductors 256 correspond with the tertiary cable 240 as previously illustrated. The positions of each connector, which correspond with the individual conductors or wires 252, 254, and 256, are similarly designated by the numerals within the individual boxes as shown and are now described in greater detail.

Positions 3, 4, 7 and 8 are for the sensor signals and are coupled between the first connector 232 and the second connector 234 while being electrically isolated from positions 1 and 5, which are the power positions. As such, the first connector 232 receives power from the power controller 210 and provides power to the second connector 234 through positions 1 and 5, and power is subsequently provided to the third connector 238 and the fourth connector 242 through their respective positions 1 and 3 as shown. Therefore, input power to the adaptor cable assembly 220 is received by the 8 position first connector 232 and distributed to the 8 position second connector 234 and subsequently to the 4 position third connector 238 and the 4 position fourth connector 242. The second connector 234 provides power to the primary power load 212, the third connector 238 provides power to the secondary power load 214, and the fourth connector 242 provides power to the tertiary power load 216. If the primary power load 212 is disconnected from the power controller coupling assembly 200, power is advantageously still provided to the secondary power load 214 and the tertiary power load 216 without interrupting system operation. Similarly, if the secondary power load 214 is disconnected from the power controller coupling assembly 200, power is advantageously still provided to the tertiary power load 216 without interrupting system operation. Preferably, eighteen (18) gauge wires are used for power distribution while sensor wires are typically twenty-four (24) gauge wires.

The terminator cable assemblies 222 and 224 of FIG. 9 are as they are described in connection with FIG. 2 and are thus not described in greater detail in this alternate power controller coupling assembly 200.

Referring now to FIG. 12, yet another alternate form of a power controller coupling assembly is illustrated and generally indicated by reference numeral 300. Generally, the power controller coupling assembly 300 is configured to provide substantially uninterruptible power among a plurality of power controllers 310, 312, and 314 from a single or common power source. The power controller coupling assembly 300 receives power from the power source and is distributed to each of the first power controller 310, the second power controller 312, and the third power controller 314. In this exemplary embodiment, power to each controllers 310, 312, and 314 is preferably daisy-chained by two (2) 6-8-6 jumper cable assemblies 316 and 318, and a 6-8 terminator cable assembly 320. Each of the power controllers 310, 312, and 314 are coupled to respective power loads, namely, first power load 322, second power load 324, and third power load 326. Terminations from each power load 322, 324, 326

(which are heaters in one form of the present disclosure) to its respective controller are via an 8 position connector as shown and may include active sensor connections as previously described. Advantageously, in this power controller coupling assembly 300, if any controller 310, 312, or 314 is disconnected from the power source, successive power connections are maintained and are not disrupted.

Each of the jumper cable assemblies 316 and 318, and the terminator cable assembly 320, along with their respective electrical circuits are now described in greater detail.

Referring now to FIGS. 13 and 14, a jumper cable assembly 316 (jumper cable assembly 318 is substantially the same and is not further described herein for purposes of clarity) and its corresponding electrical circuit are described in greater detail. The jumper cable assembly 316 preferably comprises a coiled power cable 330 (which could alternately be a straight cable as illustrated in FIG. 3) that couples a first connector 332, a second connector 334, and a third connector 336. The first connector 332 defines a 6 position configuration for coupling to the power source (or to another jumper cable assembly as with jumper cable assembly 318). The second connector 334 also defines a 6 position configuration for coupling to the jumper cable assembly 318 (or to the terminator cable assembly 320 as with jumper cable assembly 318). The third connector 336 defines an 8 position configuration for coupling to the first power controller 310. In this embodiment, power is received from the power source through the first connector 332 and coiled power cable 330 and is furnished to the first power controller 310 through the third connector 336. Power to the second power controller 312 is provided through the second connector 334 to the other jumper cable assembly 318. As previously set forth, the jumper cable assemblies 316 and 318 are referred to as 6-8-6 connector configurations with the numbers representing the number of available wire termination slots/positions at each connector.

As shown in FIG. 14, the electrical circuit that corresponds with the jumper cable assemblies 316 and 318 is illustrated and generally indicated by reference numeral 340. Connectors 332 and 334 each include 6 slots/positions for parallel power distribution, and the third connector 336 includes 8 slots/positions for power distribution to the first power controller 310. Since the power connections are in parallel, if the second power controller 312 or the third power controller 314 are disconnected from the power controller coupling assembly 300, power is advantageously still provided to the other power controllers without interrupting system operation. More specifically, in one form of the present disclosure, two jumper wires 350 and 352 are disposed about the third connector 336. Therefore, if the first power controller 310 is disconnected from the power controller coupling assembly 300, the other power controllers will still receive power.

Preferably, power is provided via eighteen (18) gauge wires from the first connector 332 to the third connector 336 and to the second connector 334. Power wiring to the third connector 336 is achieved in one form by double-crimping wire leads to slots 1 and 2. The other sides of the jumper wires 350 and 352 in slots 1 and 2 are also double-crimped to slots 6 and 5, respectively. Power to the second connector 334 is achieved by connecting one of the double-crimped leads in slots 6 and 5 of the third connector 336 to slots 1 and 4 of the second connector 334, respectively. In this example, the third connector 336 does not carry the combined power loads of the second connector 334 and the third connector, as the power connections to the second connector 334 bypass the third connector 336. The use of a higher current carrying capacity wire gauge for the power leads, as compared to the twenty-four (24) wiring for the other illustrated cable connections, permits the second and third connectors 334 and 336 to conduct higher currents. An additional benefit of this power wiring assembly resides in the fact that the power connections are in parallel and not serial. Should the third connector 336 fail, power is still provided to the second connector 334. If the power connections were in series, the third connector 336 would have to be capable of supporting the power loads of both connections and should the third connector 336 fail, power would be lost to the second connector 334.

The additional twenty-four (24) gauge wires may be used to connect to auxiliary functions of the power controller in one form of the present disclosure. Auxiliary functions can include process alerts and alarms by way of example. Additionally, the non-used connector slots shown throughout this disclosure provide added electrical isolation between the eighteen (18) gauge power leads and the twenty-four (24) gauge leads.

Now referring to FIGS. 15 and 16, the terminator cable assembly 320 and its corresponding electrical circuit are described in greater detail. The terminator cable assembly 320 preferably comprises a coiled power cable 360 (which could alternately be a straight cable as illustrated in FIG. 3) that couples a first connector 362 to a second connector 364. The first connector 362 defines a 6 position configuration for coupling to the jumper cable assembly 318 as previously described. The second connector 364 defines an 8 position configuration for coupling to the third power controller 314.

As shown in FIG. 16, the electrical circuit that corresponds with this terminator cable assembly 320 is illustrated and generally indicated by reference numeral 370. The first connector 362 includes 6 slots/positions and the second connector 364 includes 8 slots/positions for power load termination at the third power controller 314. In this embodiment, parallel power is preferably carried by eighteen (18) gauge wires with power wire connections terminating from slot 4 of the first connector 362 to the second connector 364 slots 1 and 5, and from slot 1 of the first connector 362 to the second connector 364 slots 2 and 6. The double termination of power on the second connector 364 provides connector power termination redundancy. In this exemplary embodiment, the first connector 362 is a 6 position connector with slots 2 and 5 not used, and the second connector is an 8 position connector with slots 3 and 7 not used. The remaining two cable connections are preferably made with twenty-four (24) gauge wires and may be used for the auxiliary functions as previously described. As previously set forth, the non-used connector slots provide added electrical isolation between the power leads and the twenty-four (24) gauge auxiliary wires.

The connectors as illustrated and described herein may be either custom connectors or standard connectors such as, by way of example, Molex® MiniFit® connectors. It should be understood by those skilled in the art that other brands and types of connectors can also be utilized and still be within the scope of the present disclosure.

In operation, the power controller coupling assemblies as illustrated and described herein enable new and improved methods and procedures for coupling power loads to power controllers.

Those skilled in the art will recognize that various changes can be made to the exemplary embodiments and implementations described above without departing from the scope of the invention. Accordingly, all matter contained in the above description or shown in the accompanying drawings should be interpreted as illustrative and not in a limiting sense. When describing elements or features of the present invention or embodiments thereof, the articles "a", "an", "the", and "said"

are intended to mean that there are one or more of the elements or features. It is further to be understood that the processes or steps described herein are not to be construed as necessarily requiring their performance in the particular order discussed or illustrated. It is also to be understood that additional or alternative processes or steps may be employed.

What is claimed is:

1. A power controller coupling assembly comprising:
   a power controller;
   an adapter cable assembly coupled to the power controller;
   a primary power load coupled to the power controller through the adapter cable assembly;
   a jumper cable assembly coupled to the adapter cable assembly;
   a secondary power load coupled to the jumper cable assembly;
   a terminator cable assembly coupled to the jumper cable assembly and a tertiary power load coupled to the terminator cable assembly,
   wherein power is provided from the power controller to the power loads through the cable assemblies in a parallel configuration such that power is provided to each of the power loads if one or more of the power loads should become disconnected from the power controller coupling assembly, wherein both sensor signals and power being transmitted between the power controller and primary power load through the adapter cable assembly and power being transmitted between the adapter cable assembly and the secondary power load through the jumper cable assembly.

2. The power controller coupling assembly according to claim 1, wherein the adapter cable assembly comprises:
   a primary cable;
   a first connector disposed at one end of the primary cable and adapted for coupling to the power controller;
   a second connector disposed at another end of the primary cable and adapted for coupling to the primary power load;
   a secondary cable coupled to the second connector; and
   a third connector disposed at an end of the secondary cable and adapted for coupling to the jumper cable assembly.

3. The power controller coupling assembly according to claim 2, wherein the first connector defines an 8 position configuration, the second connector defines an 8 position configuration, and the third connector defines a 4 position configuration.

4. The power controller coupling assembly according to claim 1, wherein the jumper cable assembly comprises:
   a power cable;
   a first connector disposed at one end of the power cable and adapted for coupling to the power controller;
   a second connector disposed at another end of the power cable and adapted for coupling to the terminator cable assembly; and
   a third connector disposed along the power cable and adapted for coupling to the primary power load.

5. The power controller coupling assembly according to claim 4, wherein the first connector defines a 4 position configuration, the second connector defines a 4 position configuration, and the third connector defines an 8 position configuration.

6. The power controller coupling assembly according to claim 4, wherein the power cable defines a coiled configuration.

7. The power controller coupling assembly according to claim 1, wherein the terminator cable assembly comprises:
   a power cable;
   a first connector disposed at one end of the power cable and adapted for coupling to the jumper cable assembly; and
   a second connector disposed at another end of the power cable and adapted for coupling to the tertiary power load.

8. The power controller coupling assembly according to claim 7, wherein the first connector defines a 4 position configuration and the second connector defines an 8 position configuration.

9. The power controller coupling assembly according to claim 8, wherein the power cable defines a coiled configuration.

10. The power controller coupling assembly according to claim 1, wherein the adapter cable assembly is adapted to conduct sensor signals from the primary power load to the power controller.

11. The power controller coupling assembly according to claim 1, wherein at least one of the power loads is a heater.

12. The power controller coupling assembly according to claim 11, wherein the adapter cable assembly is adapted to conduct temperature sensor signals from the primary power load to the power controller.

13. A power controller coupling assembly comprising:
    a power controller;
    an adapter cable assembly coupled to the power controller;
    a primary power load coupled to the power controller through the adapter cable assembly;
    a first terminator cable assembly coupled to the adapter cable assembly;
    a secondary power load coupled to the first terminator cable assembly;
    a second terminator cable assembly coupled to the adaptor cable assembly; and
    a tertiary power load coupled to the second terminator cable assembly,
    wherein power is provided from the power controller to the power loads through the cable assemblies in a parallel configuration such that power is provided to each of the power loads if one or more of the power loads should become disconnected from the power controller coupling assembly, wherein both sensor signals and power being transmitted between the power controller and primary power load through the adapter cable assembly and power being transmitted between the adapter cable assembly and the secondary power load through the jumper cable assembly.

14. The power controller coupling assembly according to claim 13, wherein the adapter cable assembly comprises:
    a primary cable;
    a first connector disposed at one end of the primary cable and adapted for coupling to the power controller;
    a second connector disposed at another end of the primary cable and adapted for coupling to the primary power load;
    a secondary cable coupled to the second connector;
    a third connector disposed at one end of the secondary cable and adapted for coupling to the secondary power load;
    a tertiary cable coupled to the third connector; and
    a fourth connector disposed at one end of the tertiary cable and adapted for coupling to the tertiary power load.

15. The power controller coupling assembly according to claim 14 wherein the first connector defines an 8 position configuration, the second connector defines an 8 position configuration, the third connector defines a 4 position configuration, and the fourth connector defines a 4 position configuration.

16. The power controller coupling assembly according to claim 14, wherein at least one of the cables defines a coiled configuration.

17. A power controller coupling assembly comprising:
a plurality of power controllers;
a corresponding plurality of jumper cable assemblies coupled to the plurality of power controllers;
at least one terminator cable assembly coupled to at least one of the plurality of power controllers;
a corresponding plurality of power loads coupled to the power controllers through the jumper cable assemblies and the terminator cable assembly;
a power cable;
a first connector disposed at one end of the power cable and adapted for coupling to at least one of a power source or another jumper cable assembly;
a second connector disposed at another end of the power cable and adapted for coupling to at least one of another jumper cable assembly or the terminator assembly; and
a third connector disposed along the power cable and adapted for coupling to at least one power controller;
wherein power is provided from a power source to the plurality of power controllers to the plurality of power loads through the cable assemblies in a configuration such that power is provided to each of the power controllers and power loads if one or more of the power controllers should become disconnected from the power controller coupling assembly.

18. The power controller coupling assembly according to claim 17 wherein the first connector defines a 6 position configuration, the second connector defines a 6 position configuration, and the third connector defines an 8 position configuration.

19. The power controller coupling assembly according to claim 17, wherein the terminator cable assembly comprises:
a power cable;
a first connector disposed at one end of the power cable and adapted for coupling to the jumper cable assembly; and
a second connector disposed at another end of the power cable and adapted for coupling to at least one of the power controllers.

20. The power controller coupling assembly according to claim 17, wherein at least one of the cable assemblies defines a coiled configuration.

* * * * *